US011745538B2

(12) United States Patent
Meggiolan et al.

(10) Patent No.: US 11,745,538 B2
(45) Date of Patent: Sep. 5, 2023

(54) BICYCLE RIM MADE OF COMPOSITE MATERIAL WITH WINGS HAVING REINFORCED STRUCTURE

(71) Applicant: CAMPAGNOLO S.r.l., Vicenza (IT)

(72) Inventors: Mario Meggiolan, Creazzo (IT); Mauri Feltrin, Nanto (IT); Leonardo Antonio Demelio, Ruvo di Puglia (IT); Filippo Bove, Padua (IT)

(73) Assignee: CAMPAGNOLO S.r.l., Vicenza (IT)

( * ) Notice: Subject to any disclaimer, the term of this patent is extended or adjusted under 35 U.S.C. 154(b) by 230 days.

(21) Appl. No.: 17/237,394

(22) Filed: Apr. 22, 2021

(65) Prior Publication Data
US 2021/0331518 A1    Oct. 28, 2021

(30) Foreign Application Priority Data
Apr. 22, 2020    (IT) ........................ 102020000008644

(51) Int. Cl.
*B60B 21/02*    (2006.01)
*B60B 5/02*    (2006.01)
*B60B 21/10*    (2006.01)
(52) U.S. Cl.
CPC .............. *B60B 21/021* (2013.01); *B60B 5/02* (2013.01); *B60B 21/025* (2013.01); *B60B 21/026* (2013.01); *B60B 21/10* (2013.01); *B60B 2310/204* (2013.01); *B60B 2310/242* (2013.01); *B60B 2360/341* (2013.01)

(58) Field of Classification Search
CPC ......... B60B 5/02; B60B 21/02; B60B 21/025; B60B 21/026; B60B 21/10; B60B 2310/242; B60B 2310/204; B60B 2360/341
See application file for complete search history.

(56) References Cited

U.S. PATENT DOCUMENTS 5,540,485 A  *  7/1996  Enders .................... B60B 1/003
                                                     301/64.704
6,347,839 B1 *  2/2002  Lew ...................... B60B 21/062
                                                     301/95.102
(Continued)

FOREIGN PATENT DOCUMENTS

| EP | 1506882 B1 | 7/2008 |
| EP | 2062747 A2 | 5/2009 |
| EP | 1231077 B2 | 8/2015 |

OTHER PUBLICATIONS

Italian Search Report and Written Opinion in Italian Application No. 102020000008644, dated Sep. 18, 2020 with English translation.

*Primary Examiner* — S. Joseph Morano
*Assistant Examiner* — Emily G. Castonguay
(74) *Attorney, Agent, or Firm* — Steinfl + Bruno, LLP (57) ABSTRACT

A bicycle rim is made with a plurality of layered, each of which is formed of structural fibres incorporated in a polymeric material. The rim has a radially outer peripheral channel with an upper bridge extending between the wings for holding a tyre. The peripheral channel comprises an inner layered structure, extending between wings and at least one wrapping layered structure, wound on the inner layered structure at least at the end of the wings, the inner layered structure and the wrapping layered structure being included in the plurality of layered structures.

16 Claims, 8 Drawing Sheets

(56) References Cited

U.S. PATENT DOCUMENTS

| | | | |
|---|---|---|---|
| 9,718,305 B2 | 8/2017 | Kashimoto et al. | |
| 2007/0205654 A1* | 9/2007 | Denk | B60B 21/062 |
| | | | 301/95.102 |
| 2008/0296961 A1* | 12/2008 | Dal Pra' | B60B 25/00 |
| | | | 301/95.103 |
| 2010/0013119 A1* | 1/2010 | Meggiolan | B60B 5/02 |
| | | | 264/271.1 |
| 2011/0089750 A1* | 4/2011 | Colegrove | B60B 5/02 |
| | | | 301/95.102 |
| 2013/0169030 A1* | 7/2013 | Alexandre | B60B 31/005 |
| | | | 301/95.104 |
| 2016/0243732 A1* | 8/2016 | Wissler | B29C 43/027 |
| 2016/0303903 A1* | 10/2016 | Kashimoto | B60B 21/08 |
| 2020/0369081 A1* | 11/2020 | D'Armancourt | B29C 70/222 |
| 2021/0094345 A1* | 4/2021 | Christensen | B60B 21/025 |

* cited by examiner

BICYCLE RIM MADE OF COMPOSITE MATERIAL WITH WINGS HAVING REINFORCED STRUCTURE

CROSS REFERENCE TO RELATED APPLICATION

This application claims the benefit of Italian Application No. 102020000008644, filed on Apr. 22, 2020 which is incorporated herein by reference as if fully set forth.

FIELD OF INVENTION

The present invention relates to a bicycle wheel made of composite material, in particular a material that comprises structural fibres (such as carbon fibres, glass fibres, boron fibres, aramid fibres, ceramic fibres and combinations thereof) incorporated in a matrix of thermosetting polymeric material.

BACKGROUND

The use of composite materials is increasingly widespread for making parts and components of a bicycle, in order to obtain very light and strong parts. Rims are now increasingly made with these materials.

Making a rim in composite material provides for the forming in a mold. The composite material is arranged in the mold in an uncured state, making it take up the shape of the mold; the operation is possible since in the uncured state the composite material is quite easily deformable. Subsequently, the mold is closed, compressing the composite material so as to force it to take up the desired shape. The mold with the composite material is then subjected to a heat treatment (also called curing) that causes the cross-linking (polymerization) of the matrix of polymeric material and therefore the locking of the structural fibres in the predetermined position. Once extracted from the mold, the rim may be subjected to possible mechanical processing (typically milling and polishing) until the final shape thereof is reached.

The prior art provides molds of two types: axial and radial. In axial molds, there are two shells that are brought together and pressed on the composite material in the axial direction of the rim. In radial molds, there are a radially inner shell and a radially outer shell, which are brought together and pressed on the composite material in the radial direction of the rim; if the rim has a geometry that provides one or more closed inner channels, so-called pockets, i.e. inflatable inserts, are used. With both types of molds, for geometric reasons, the shells can (or must) be made in many separable parts; for the same reasons, there can (or must) be mold inserts (also called cores) to make undercut parts, for example the wings for holding the tyre.

A bicycle rim is a particularly delicate component, because it is subjected to very diversified and variable stresses. Moreover, the two wheels as a whole constitute a large fraction of the total mass of the bicycle. Those in the field are always seeking improvements that make it possible to have increasingly light and strong wheels.

SUMMARY

The Applicant has found that a rim with a radially outer peripheral channel having an upper bridge extending between tyre hold wings can benefit from the peripheral channel having an inner layered structure extending between wings and a wrapping layered structure at least at the ends of the wings. The inner layered structure and the wrapping layered structure are part of a plurality of structural layers.

A preferred method for forming the Applicant's rim also is disclosed.

BRIEF DESCRIPTION OF THE DRAWINGS

Further features and advantages of the invention will become clearer from the following description of some preferred embodiments thereof. In the attached drawings.

DETAILED DESCRIPTION OF THE PREFERRED EMBODIMENTS

Hereinafter, spatial indications, like in particular those of radial, axial, circumferential direction are given with reference to the rotation axis of the rim, i.e. of a bicycle wheel to which the rim belongs.

A bicycle rim is made with a plurality of layered structures of composite material, each formed by one or more layers of structural fibres incorporated in a polymeric material, that comprise a radially outer peripheral channel having an upper bridge extending between two opposite wings for holding a tyre, where the peripheral channel comprises an inner layered structure, extending from one of the wings up to the other, and a wrapping layered structure, wound on the inner layered structure at least at the end of the wings and closed on itself, the inner layered structure and the wrapping layered structure being included in the plurality of layered structures.

In the context of the present description and the attached claims, the term layered structure is meant to indicate a set of one or more single layers of structural fibres incorporated in a matrix of a thermosetting or thermoplastic polymeric material, preferably a thermosetting resin.

The wrapping layered structure on the end of the wings not only provides a reinforcement to the wings themselves, but also protects the ends of the wings with respect to possible delamination phenomena, preventing the occurrence thereof in case of traumatic events, like for example the bursting of a tyre or a particularly heavy impact of the rim on a rigid obstacle.

As well as the strengthening and protection effect of the wings, a very significant stiffening of the entire peripheral channel is obtained, thanks to the substantially box-like structure that is created around the inner layered structure thanks to the wrapping layered structure.

Preferably, the wrapping layered structure is closed on itself through an initial flap overlapping a final flap. In this way, the box-like structure is complete and already closed on the wrapping layered structure, and thus ensures the maximum structural strength of the peripheral channel.

In a preferred embodiment, the rim comprises a closed radially inner channel, integral with the peripheral channel in a radially inner position thereof; the closed channel is defined by two opposite side walls joined to one another by the upper bridge and by a lower bridge in a radially inner position; the closed channel comprises a closed channel layered structure, extending along the lower bridge, the side walls and at least part of the upper bridge, the closed channel layered structure being included in said plurality of layered structures. The closed channel layered structure thus has a particularly strong structure, since it is substantially box-like.

Preferably, the closed channel layered structure ends in an initial flap and a final flap at the peripheral channel, and the initial and final flaps of the closed channel layered structure are juxtaposed to the wrapping layered structure. The closed channel layered structure is thus coupled to the peripheral channel at the upper bridge, so that the closed channel and the peripheral channel cooperate to give the rim the maximum strength.

In an embodiment, the initial flap is spaced from the final flap, so as to leave the wrapping layered structure partially facing towards the inside of the closed channel. In another embodiment, the initial flap overlaps the final flap, so that the inside of the closed channel is entirely surrounded by the closed channel layered structure. Whereas overlapping ensures the maximum structural strength, thanks to the closed box-like structure already formed from only the closed channel layered structure, spacing can be preferred for greater ease of construction: in this case, indeed, the closed channel layered structure is more easily mobile in the mold during forming and before curing, under the thrust of a pression pocket around which it is wound.

Preferably, the peripheral channel comprises two inner wing layered structures, each overlapping the inner layered structure at each of the wings and enclosed together with the inner layered structure by the wrapping layered structure, the inner wing layered structures being included in said plurality of layered structures. The presence of these layered structures increases the structural strength of the wings, which are often subject to greater stresses with respect to the rest of the peripheral channel; their positioning within the wrapping layered structure ensures the maximum mechanical interaction both with the wrapping layered structure, and with the inner layered structure.

Preferably, the rim comprises an outer layered structure, extending externally from one of the wings, to one of the side walls, to the lower bridge, to the other of the side walls, to the other of the wings; the outer layered structure overlaps the closed channel layered structure at the closed channel and over the wrapping layered structure at the wings, the outer layered structure being included in said plurality of layered structures. The contribution of this outer layered structure to the overall structural strength of the rim is very important, since it joins together the peripheral channel and the closed channel.

Preferably, the rim comprises two outer wing layered structures, each overlapping the wrapping layered structure at each of the wings and over the closed channel layered structure at the closed channel, below the outer layered structure, the outer wing layered structures being included in said plurality of layered structures. These outer wing layered structures are used to reinforce the wings, without however determining discontinuity outside of the rim since they are positioned below the outer layered structure.

Preferably, the rim comprises a lower bridge layered structure, at the lower bridge, the lower bridge layered structure being included in said plurality of layered structures. The strengthening of the area of the lower bridge through this layered structure is useful because it is in this area that the spokes of the wheel are connected, which can determine even very high localized stresses.

In an embodiment, the lower bridge layered structure is arranged between the outer layered structure and the closed channel layered structure. In another embodiment, the lower bridge layered structure overlaps the closed channel layered structure on the opposite side with respect to the outer layered structure. Whereas the interposition ensures the maximum structural strength, thanks to the better interaction with the adjacent layered structures, the positioning on the opposite side with respect to the outer layered structure, i.e. inside the closed channel, may be preferred for greater ease of construction, because the correct positioning in the mold is easier.

Preferably, the rim comprises two circumferential inserts, each arranged at a convergence area of the upper bridge with one of the wings; each insert is formed from directional structural fibres incorporated in a polymeric material, with the directional structural fibres oriented in the circumferential direction of the rim.

If the rim also provides for a closed channel, then it preferably comprises two circumferential inserts, each arranged at a convergence area of one of the side walls with the upper bridge and one of the wings; each insert is formed from directional structural fibres incorporated in a polymeric material; each insert is inserted between the closed channel layered structure and the wrapping layered structure, below the outer layered structure, with the directional structural fibres oriented in the circumferential direction of the rim.

The aforementioned circumferential inserts contribute to giving a high mechanical strength particularly in the circumferential direction.

The various layered structures of composite material—as stated—can comprise one or more layers of structural fibres incorporated in a polymeric matrix; the structural fibres can be unidirectional, oriented according to predetermined angles, or woven as a kind of fabric.

Preferably, the wings have respective ends folded towards one another according to a predetermined acute angle $\alpha$ with respect to the axial direction of the rim, and the peripheral channel comprises a pair of circumferential projections with a surface inclined by an acute angle $\beta$ with respect to the axial direction of the rim, wherein $\alpha>\beta$. The folded ends of the wings and the projections on the peripheral channel promote the correct and stable positioning of the tyre; the indicated angles makes it possible to keep such a function, without however creating a hindrance when the rim just formed must be freed from the mold and in particular from the mold inserts. In general, the smaller the angle $\alpha$, the better the tyre is held; an angle $\alpha$ equal to zero, however, creates difficulty of removal of the mold inserts. The presence of the aforementioned projections makes it possible to obtain excellent holding of the tyre also with an angle $\alpha$ greater than zero, at the same time facilitating the extraction of the mold inserts. It should be noted that these features relative to the inclination of the ends of the wings and to the projections can be advantageously adopted also on a different rim than the rim of the invention; consequently, such features constitute an invention per se.

Preferably, the angle α is equal to about 20 degrees. Preferably, the difference α–β is comprised between 0.5 and 4 degrees, more preferably equal to about 2 degrees. Both of these features, singularly or together, make it possible to achieve the best compromise between holding the tyre and ease of extraction of the mold inserts.

Preferably, each projection is formed with the wrapping layered structure, but can also be made through a thickening of the thermosetting resin.

Preferably, the wings have rounded ends. This configuration not only is the simplest one to obtain with a rim according to the invention, wherein the ends of the wings are provided with the wrapping layered structure, but it is also the one that makes it possible to directly obtain such a rim without the need for significant mechanical processing after molding, with the exception of possible polishing; the polishing is considered insignificant since it only impacts superficially and only on the polymeric matrix, but does not reach the structural fibres.

In a second aspect of the invention, a method for making a bicycle rim made of composite material based on structural fibres incorporated in a polymeric material, the rim comprising a radially outer peripheral channel comprising an upper bridge extending between two opposite wings for holding a tyre, comprises the following steps:

a) providing: a radial mold shaped according to a profile of the bicycle rim; at least one pression element; and at least one mold insert for the formation in the mold of end areas adapted for the formation of the wings;

b) laying a wrapping layered structure of uncured composite material comprising structural fibres incorporated in a polymeric material on a work plane;

c) laying an inner layered structure of the uncured composite material comprising structural fibres incorporated in a polymeric material on the wrapping layered structure, the inner layered structure having length equal to that of the wrapping layered structure and width less than half the width of the wrapping layered structure;

d) folding two opposite flaps of the wrapping layered structure in the direction of the width above the inner layered structure, overlapping them over one another;

e) arranging the pression element and the wrapping layered structure in the mold, with the inner layered structure included and folded in a C, above the pression element;

f) positioning the at least one mold insert in the mold, so that the wrapping layered structure with the inner layered structure enclosed reaches the end areas of the mold;

g) closing the mold and applying a pressure on the wrapping and inner layered structures with the pression element, so as to make the polymeric material flow and move the structural fibres in the direction of the end areas of the mold, until the entire space between the mold and the at least one mold insert is occupied;

h) subjecting the mold to a pressure and temperature profile such as to cause the setting of the polymeric material;

i) opening the mold;

j) removing the at least one mold insert;

k) removing the molded bicycle rim.

Thanks to this method, and in particular to features b) to g), it is possible to obtain a substantially finished rim from the mold, without any mechanical processing except a possible polishing being necessary. The wings, in particular, do not need milling to define the final shape thereof. In this way, not only processes are avoided that in any case increase the processing times and costs, but particularly at the ends of the wings the structural fibres are prevented from being exposed to the air due to the removal of the polymeric matrix; exposure to the air can indeed over time damage the integrity of the structural fibres, triggering delamination phenomena that reduce the lifetime of the rim.

Preferably, the method also comprises the steps of:

a1) providing two circumferential inserts, wherein each insert is formed from directional structural fibres incorporated in a polymeric material, with the directional structural fibres oriented in the circumferential direction;

f1) positioning the circumferential inserts in the mold, at a convergence area of the upper bridge with one of the wings, between the wrapping layered structure with the inner layered structure enclosed and the pression element.

The two circumferential inserts not only per se strengthen the rim, as already stated above, but allow the thrust of the pression element to be exerted particularly in the sense of forcing the wrapping layered structure (with the inner layered structure enclosed) in the direction of the end areas of the mold, promoting the correct filling thereof and therefore the correct shaping of the wings.

Preferably, the method also comprises the steps of:

d1) providing a closed channel layered structure wound on the pression element.

In this way, it is possible to obtain a rim with two channels: the radially outer peripheral channel and the closed radially inner channel.

FIGS. 1-4 show a rim 10 for a bicycle wheel, in section and schematically. The rim 10 is made of composite material, for example material that comprises structural fibres incorporated in a polymeric matrix. The structural fibres are selected from carbon fibres, glass fibres, boron fibres, aramid fibres, ceramic fibres or other fibres equipped with suitable mechanical features; it is also possible for different parts of the rim 10 to be made with different fibres. The polymeric matrix is obtained with any thermoplastic or thermosetting polymeric material, compatible with the selected fibres. A thermosetting matrix, in particular, is such as to be easily deformable in the uncured state and cross-linkable by curing; the term curing here is meant to indicate a treatment that subjects the uncured material to a suitable pressure and temperature profile, so as to cause the cross-linking of the polymeric matrix and thus the solidification in a predetermined shape. A thermoplastic matrix, on the other hand, reaches the desired stiffening when subjected to injection molding.

The composite material used for the rim 10 comprises a plurality of layered structures and of inserts, made integral with each other during curing so as to form a structurally single assembly. These layered structures and these inserts are described hereinafter.

The rim 10 comprises a radially outer peripheral channel 11 and a radially inner closed channel 21. The peripheral channel 11 comprises an upper bridge 12, extending between two opposite wings 13 and 14, adapted for holding a tyre; the wings 13 and 14 are provided with respective rounded ends 15 and 16, folded towards one another so as to form an acute angle α equal to about 20° with respect to a direction A parallel to the axis of the rim 10. The closed channel 21 extends in a radially inner position from the upper bridge 12 and comprises two side walls (or flanks) 23 and 24, joined together by the upper bridge 12 and by a lower bridge 25.

The peripheral channel 11 comprises an inner layered structure 31, extending through the entire upper bridge 12 from the wing 13 to the wing 14, and a wrapping layered structure 32. The wrapping layered structure 32 is wound around the inner layered structure 31 and closed on itself so as to completely surround the inner layered structure 31, as visible in FIG. 1 and even better in FIG. 2. The wrapping layered structure 32 comprises an initial flap 32a and a final flap 32b, overlapped one another at the mid-plane M of the rim 10, in a radially inner position with respect to the upper bridge 12.

Figure 2:
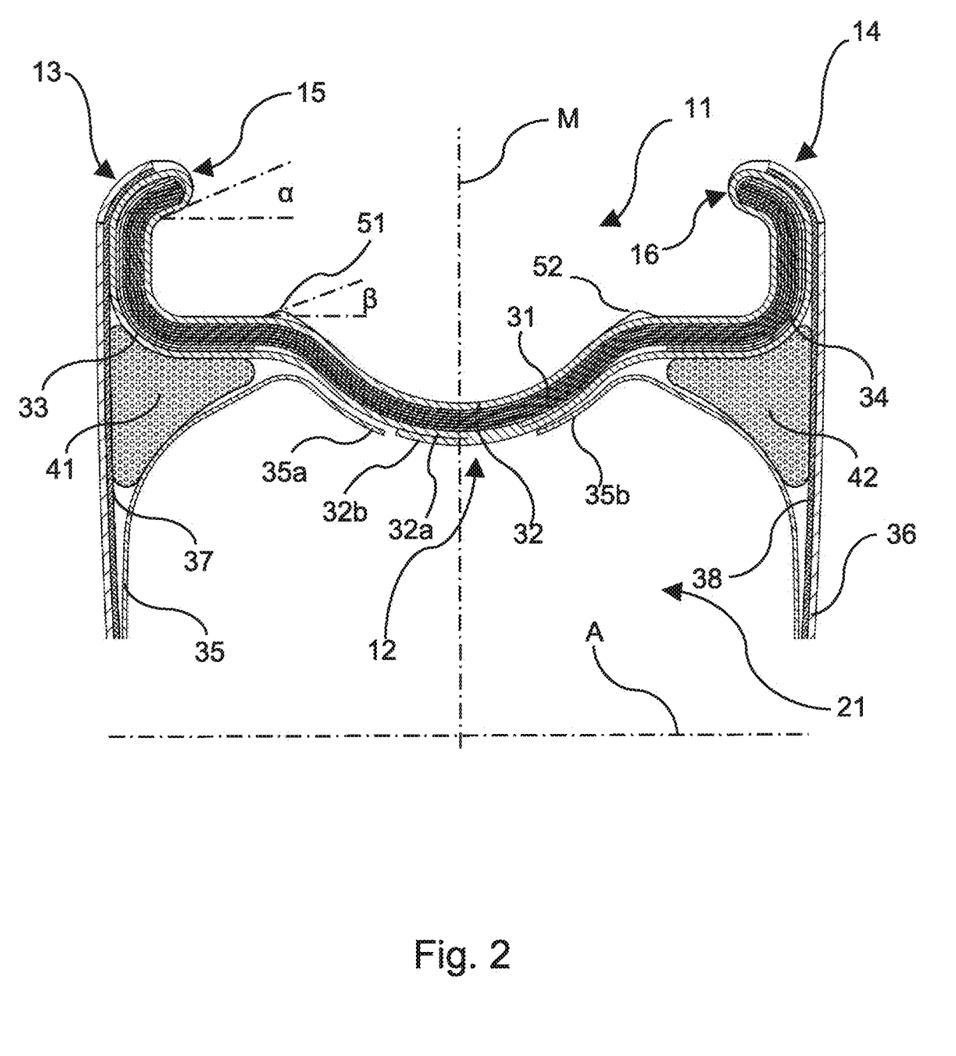
FIG. 2 is an enlarged section view of only the radially outer part of the rim of FIG. 1.
Figure 3:
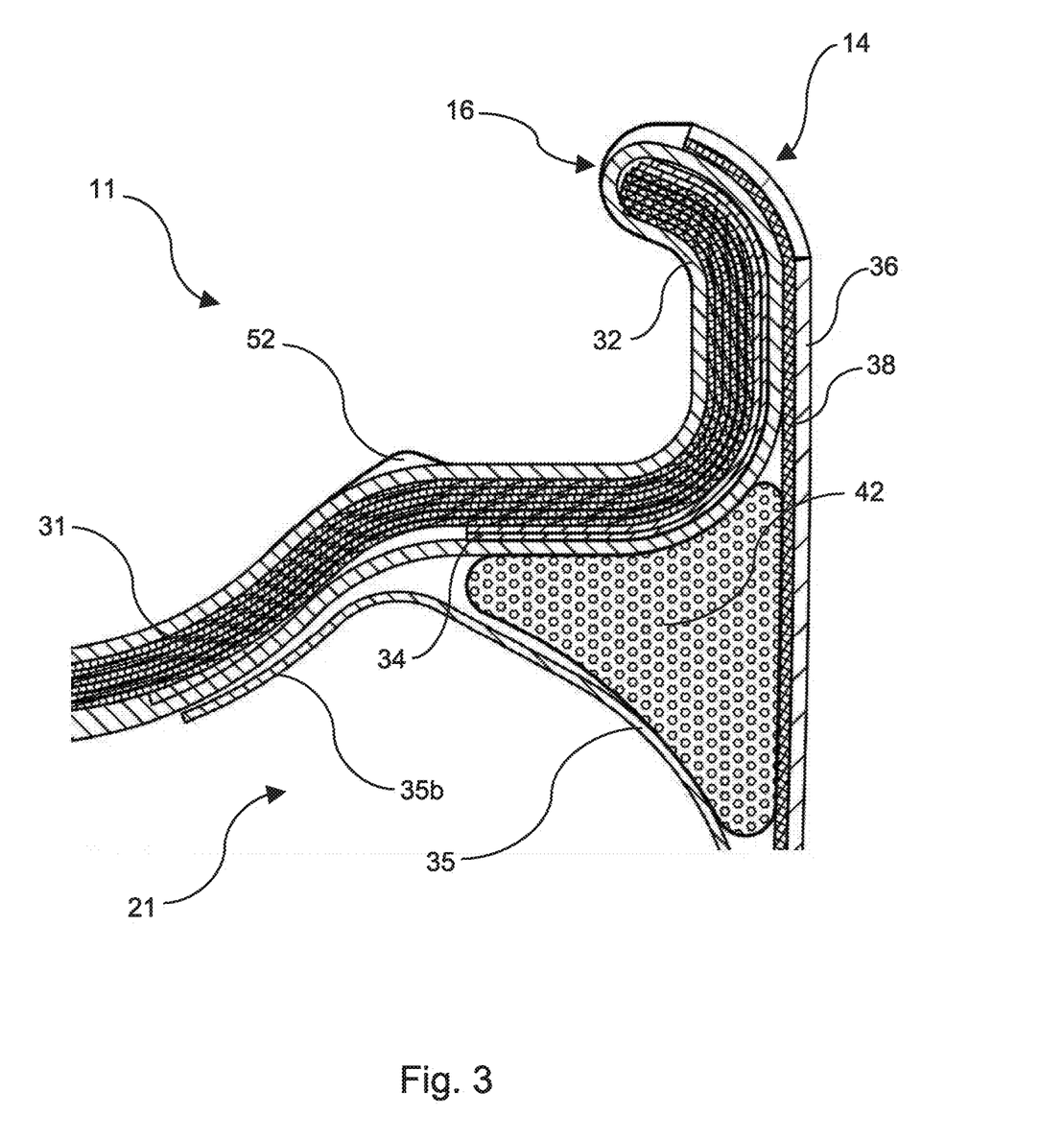
FIG. 3 is a further enlarged section view of only the radially outer side part of the rim of FIG. 1.
Figure 4:
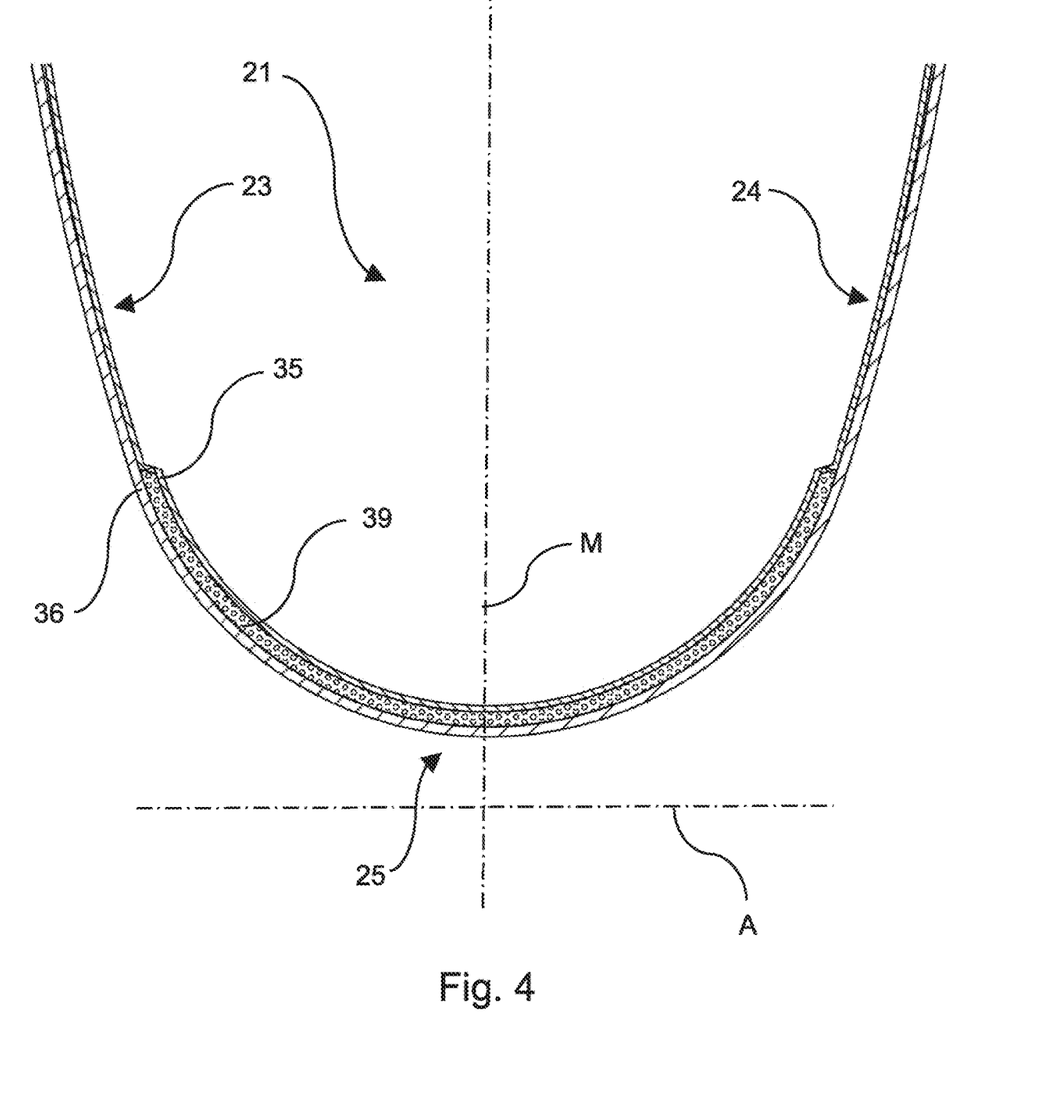
FIG. 4 is an enlarged section view of only the radially inner part of the rim of FIG. 1.

The peripheral channel also comprises two inner wing layered structures 33 and 34 (visible in FIGS. 1, 2 and particularly 3), arranged between the inner layered structure 31 and the wrapping layered structure 32 at each of the wings 13 and 14, and partially also at the upper bridge 12.

Figure 1:
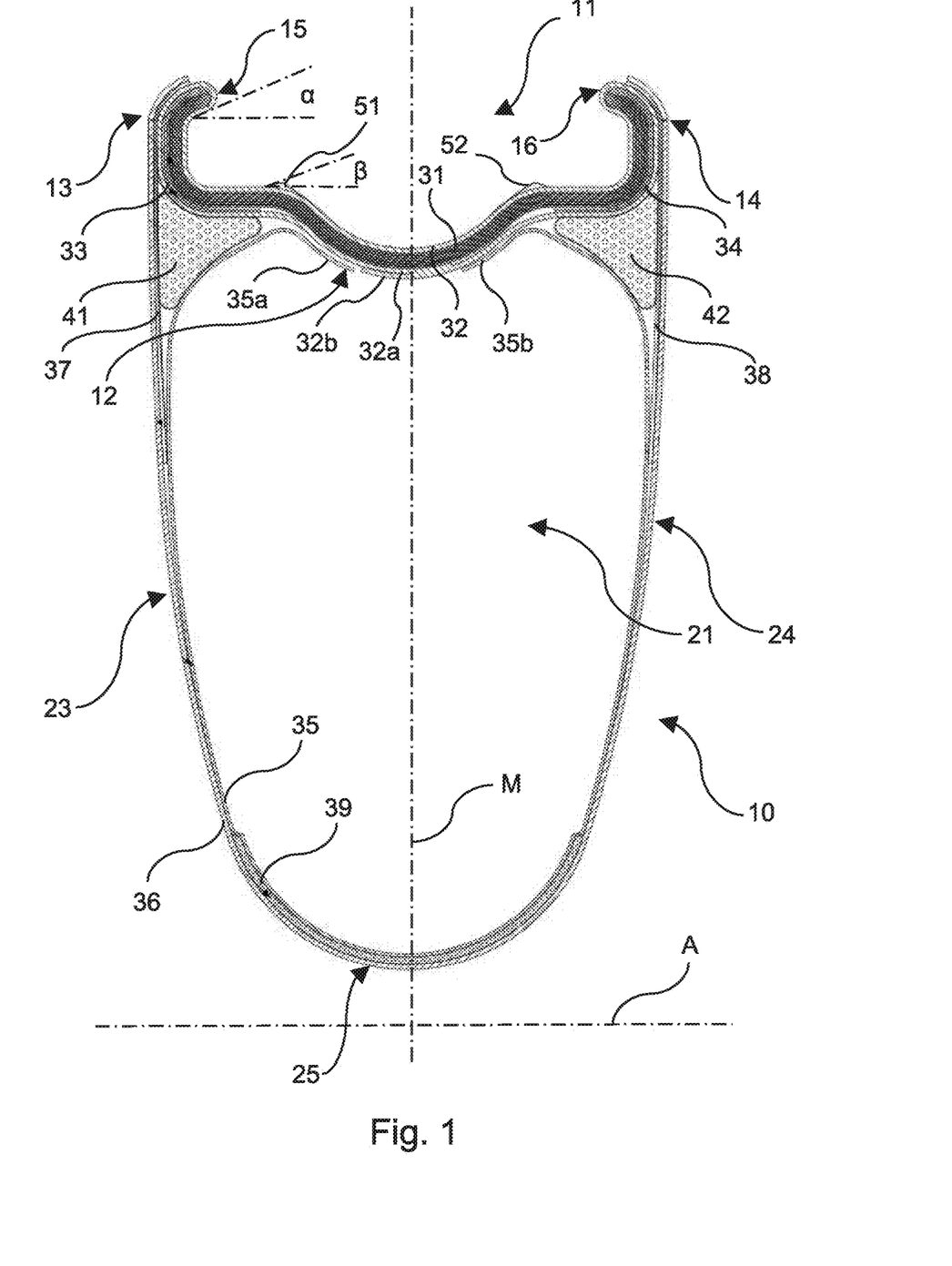
FIG. 1 is a schematic section view of a rim according to a first embodiment of the invention.

The closed channel 21 comprises a closed channel layered structure 35, extending along the side walls 23 and 24, along the lower bridge 25 and at least partially along the upper bridge 12. The closed channel layered structure 35 comprises an initial flap 35a and a final flap 35b, which are arranged at the upper bridge 12 and are juxtaposed to the wrapping layered structure 32. The two flaps 35a and 35b are spaced from one another, so that the wrapping layered structure 32 remains facing towards the inside of the closed channel 21, in particular with its flap 32b overlapping the flap 32a. In this way, the closed channel layered structure 35 does not contribute to increasing the thickness of the upper bridge 12 where the wrapping layered structure 32 already has a thickening due to the overlapping of the two flaps 32a and 32b; moreover, in making the rim 10 (which will be discussed hereinafter), the flaps 35a and 35b can more easily slide in the mold during forming, before curing.

Figure 6:
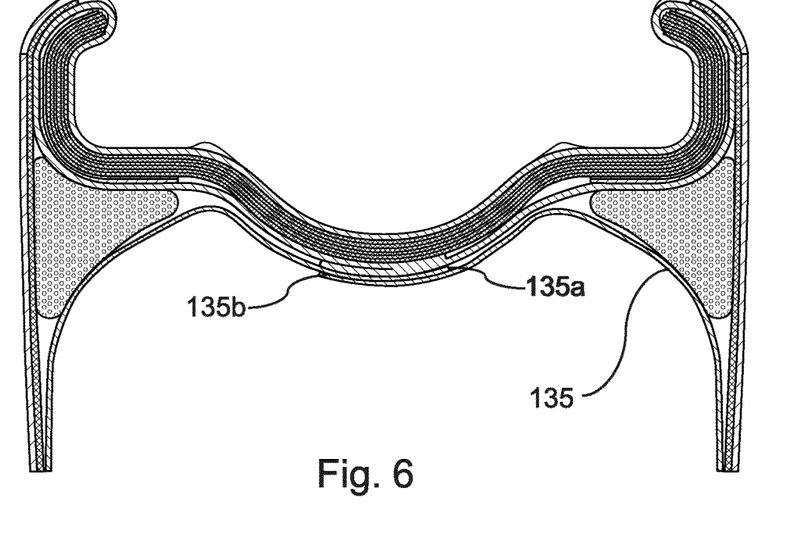
FIG. 6 is a schematic section view of a variant of the rim shown in FIG. 2.

In a variant shown in FIG. 6, the closed channel layered structure 135 has overlapped initial and final flaps 135a, 135b. In this way, the closed channel layered structure 135 is closed on itself to form a completely box-like and thus particularly rigid structure.

The rim 10 also comprises an outer layered structure 36, extending externally in the rim 10 from the wing 13, to the side wall 23, to the lower bridge 25, to the side wall 24, up to the wing 14. The outer layered structure 36 overlaps the wrapping layered structure 32 at the wings 13 and 14 and over the closed channel layered structure 35 at the closed channel 21.

The rim 10 also comprises two outer wing layered structures 37 and 38 (visible in FIGS. 1, 2 and particularly 3), each of which is arranged between the outer layered structure 36 and both the wrapping layered structure 32, at each of the wings 13 and 14, and the closed channel layered structure 35, at the side walls 23 and 24 of the closed channel 21.

Furthermore, the rim 10 comprises a lower bridge layered structure 39 (visible in FIG. 1 and particularly in FIG. 4), extending at the lower bridge 25 and arranged between the closed channel layered structure 35 and the outer layered structure 36.

Figure 7:
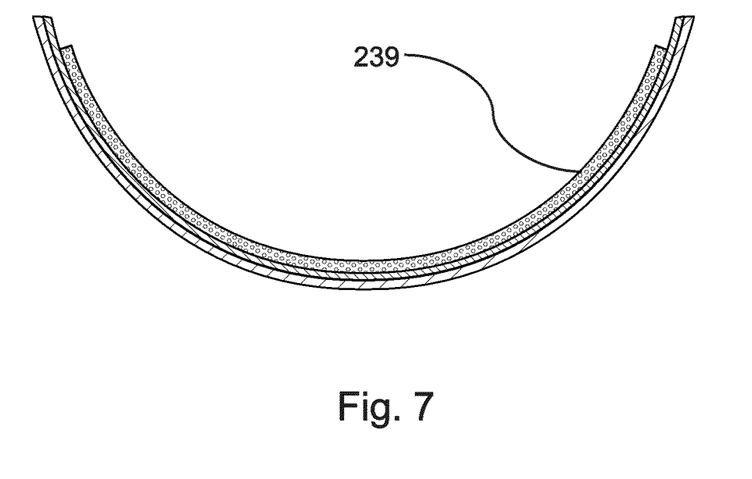
FIG. 7 is a schematic section view of a variant of the rim shown in FIG. 4.

In a variant shown in FIG. 7, the lower bridge layered structure 239 overlaps the closed channel layered structure 35, inside the closed channel 21, i.e. on the opposite side with respect to the outer layered structure 36.

The rim 10 also comprises two circumferential inserts 41 and 42, arranged in the two convergence areas between the upper bridge 12, the wings 13 and 14, and the side walls 23 and 24. These circumferential inserts 41 and 42 (preferably made according to the teachings of EP 1506882B1) are formed with directional structural fibres oriented in the circumferential direction of the rim 10, incorporated in polymeric material. The circumferential inserts 41 and 42 are inserted in the structure of the rim 10 between the wrapping layered structure 32 and the closed channel layered structure 35, below the outer wing layered structures 37 and 38 and below the outer layered structure 36.

The layered structures 31-39 are each made with one or more layers of structural fibres, preferably directional structural fibres.

The peripheral channel 11 comprises a pair of circumferential projections 51 and 52, each of which has a surface inclined by an acute angle β with respect to the direction A parallel to the rotation axis of the rim 10. With respect to the angle α of inclination of the ends 15 and 16 of the wings 13 and 14, the angle β is slightly smaller, by 0.5-4 degrees, preferably by about 2 degrees.

The projections 51 and 52 are formed with the wrapping layered structure 32, through corresponding grooves formed in the forming mold; during forming, the polymeric material of the wrapping layered structure 32 fills such grooves and forms the projections 51 and 52. Given the very limited stresses that the projections 51 and 52 must withstand, it is not necessary to take care that the structural fibres of the wrapping layered structure 32 also enter into the grooves during forming and are thus incorporated in the projections themselves. Alternatively, the grooves of the mold corresponding to the projections 51 and 52 can be filled by polymeric material, in particular a thermosetting resin.

The rim 10 can be made with one of the methods known in the field, for example with a radial mold according to the teachings of EP 1231077B2. Preferably, the rim 10 is made in the following way, illustrated with reference to FIGS. 8 and 9.

Figure 8:
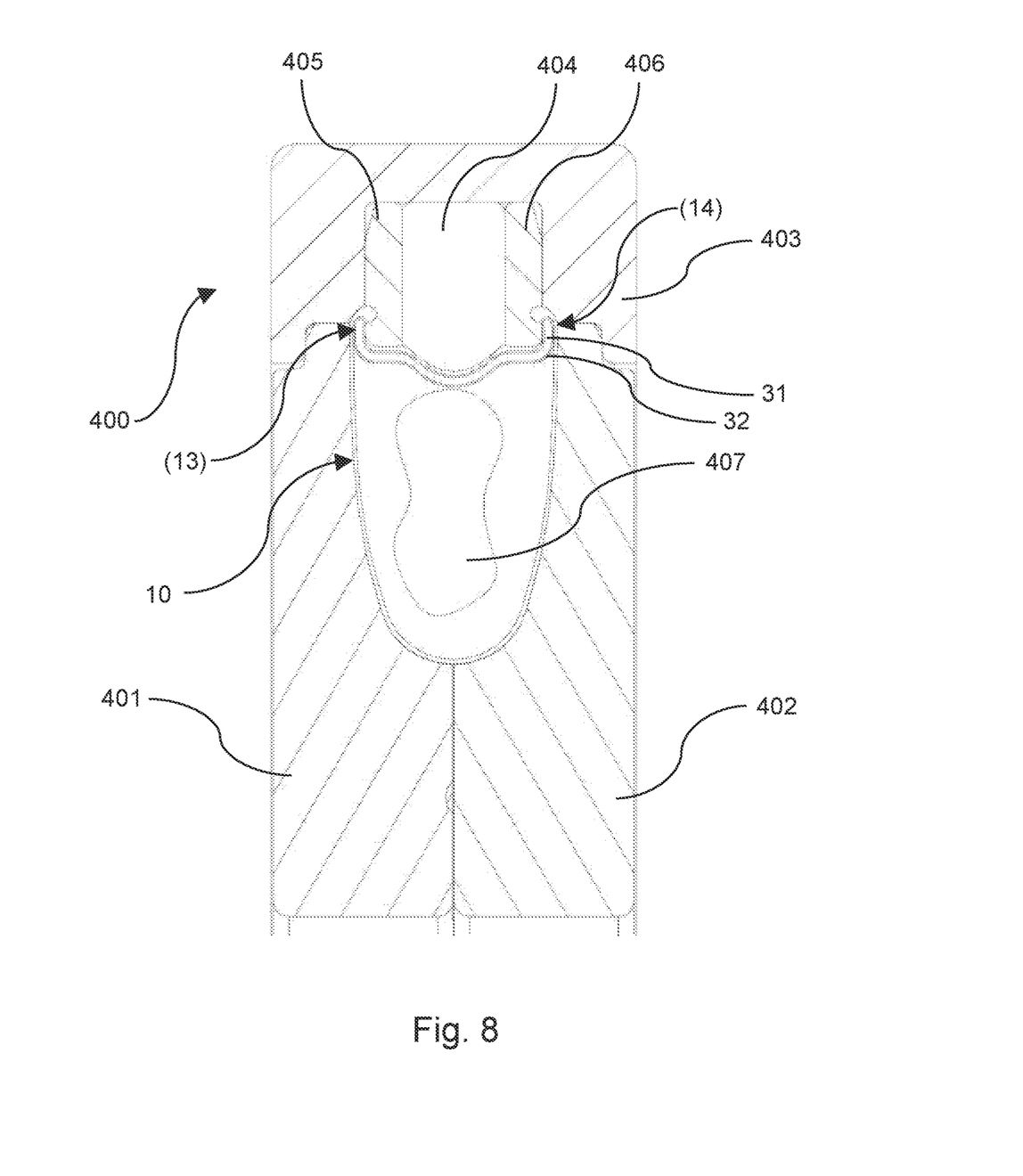
FIGS. 8 and 9 are section views of the rim of FIG. 1 (represented in a simplified manner, without all of the details thereof visible in FIGS. 1-4) inside a forming mold, during two successive steps of the forming of the rim itself.
Figure 9:
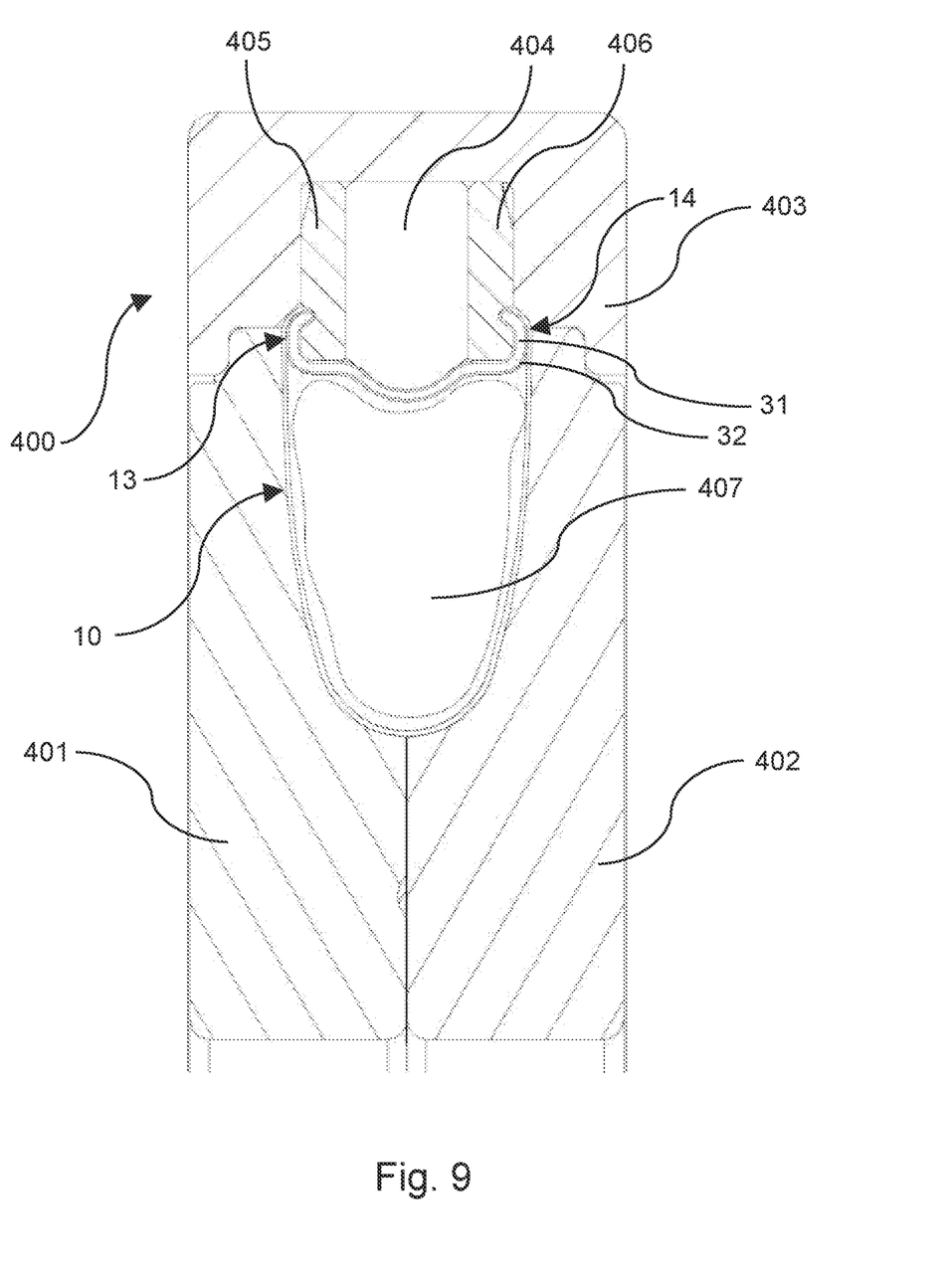

Firstly, a radial mold 400 is provided, shaped according to the profile of the rim 10. This mold 400 thus comprises (in a corresponding manner to the teachings of EP 1231077B2) a pair of radially inner shells 401 and 402, shaped so as to define the radially inner profile of the rim 10 (i.e. of the lower bridge 25 and of the side walls 23 and 24), a radially outer shell 403, provided with a central mold insert 404 (shaped so as to define the outer profile of the peripheral channel 11) and two mobile side mold inserts 405 and 406 (shaped so as to define the profile of the wings 13 and 14); both the radially outer shell 403, and the central mold insert 404 and the mobile side mold inserts 405 and 406 are made in sectors, for example three sectors of 120 degrees, so as to allow the extraction of the rim once formed. The mold 400 also comprises an inflatable and removable pression element 407, shaped to define the inner profile of the closed channel 21.

Separately, on a work plane, the layered structures are arranged in uncured state to form the peripheral channel 11. The wrapping layered structure 32 is firstly laid on the work plane, then the inner layered structure 31 is overlapped, then the inner wing layered structures 33 and 34 are overlapped; the inner layered structure 31 has the same length as the wrapping layered structure 32 (substantially equal to the circumference of the rim 10 to be made) and smaller width, less than half the width of the wrapping layered structure 32; the inner layered structure 31 and the inner wing layered structures 33 and 34 are positioned so as to reach the same position in the width direction. Therefore, leaving the inner layered structure 31 and the inner wing layered structures 33 and 34 in flat condition, the wrapping layered structure 32 is enclosed there on top, folding the two opposite flaps 32a and 32b above the inner layered structure 31 and overlapping them over one another. In this way, a first assembly of layered structures is arranged, which will form much of the peripheral channel 11.

Then, the pair of radially inner shells 401 and 402 is arranged so that they are coupled together. Inside, the outer layered structure 36, then the lower bridge layered structure 39, then the unfolded closed channel layered structure 35, then the pression element 407 are arranged; the closed channel layered structure 35 is then folded with its flaps 35a and 35b on the pression element 407. At this point, the circumferential inserts 41, 42, and finally the assembly described above are arranged in the mold 400 with the layered structures 31-34, already preformed folded in a C shape facing radially outwards.

Finally, the mold 400 is closed, placing first the mobile side mold inserts 405 and 406, then the central mold insert 404 and finally the radially outer shell 403. The configuration represented in FIG. 8 is thus reached. It should be noted that the layered structures 32 and 31 that will form the wings 13 and 14 occupy only in part, i.e. not completely, the space between the shells 401, 402, 403 and the mold inserts 405 and 406.

Once the mold 400 is closed, the pression element 407 is activated (inflating it), so as to exert a pressure from the inside towards the outside on the layered structures arranged in the mold 400. In particular, this pressure pushes on the layered structures of the preformed assembly (the wrapping layered structure 32 with the inner layered structure 31 and the inner wing layered structures 33 and 34 inside), pushing and forcing the material towards the end areas of the mold 400, until the entire space between the shells 401, 402 and 403 and the mobile side mold inserts 405 and 406 is occupied. In this step, the closed channel layered structure 35 follows the dilation of the pression element 407, without particular obstacles thanks to the non-overlapping of the flaps 35a and 35b. FIG. 9 shows the mold whereas the pression element 407 has been almost completely inflated. It should be noted that the layered structures 32 and 31 that will form the wings 13 and 14 now completely occupy the space between the shells 401, 402, 403 and the mold inserts 405 and 406.

Once the desired final shape has been reached, the mold 400 is subjected to curing, i.e. it is subjected to predetermined pressure and temperature for a predetermined time, so as to cause the setting of the polymeric material.

Once curing is complete, the mold 400 is opened and the mold inserts 404, 405 and 406 are removed; this operation is facilitated by the angles α and β indicated above. Finally, the rim 10 is removed from the mold 400.

The ends 15 and 16 of the wings 13 and 14 are already provided with their final rounded shape, without the need for further mechanical processing.

Figure 5:
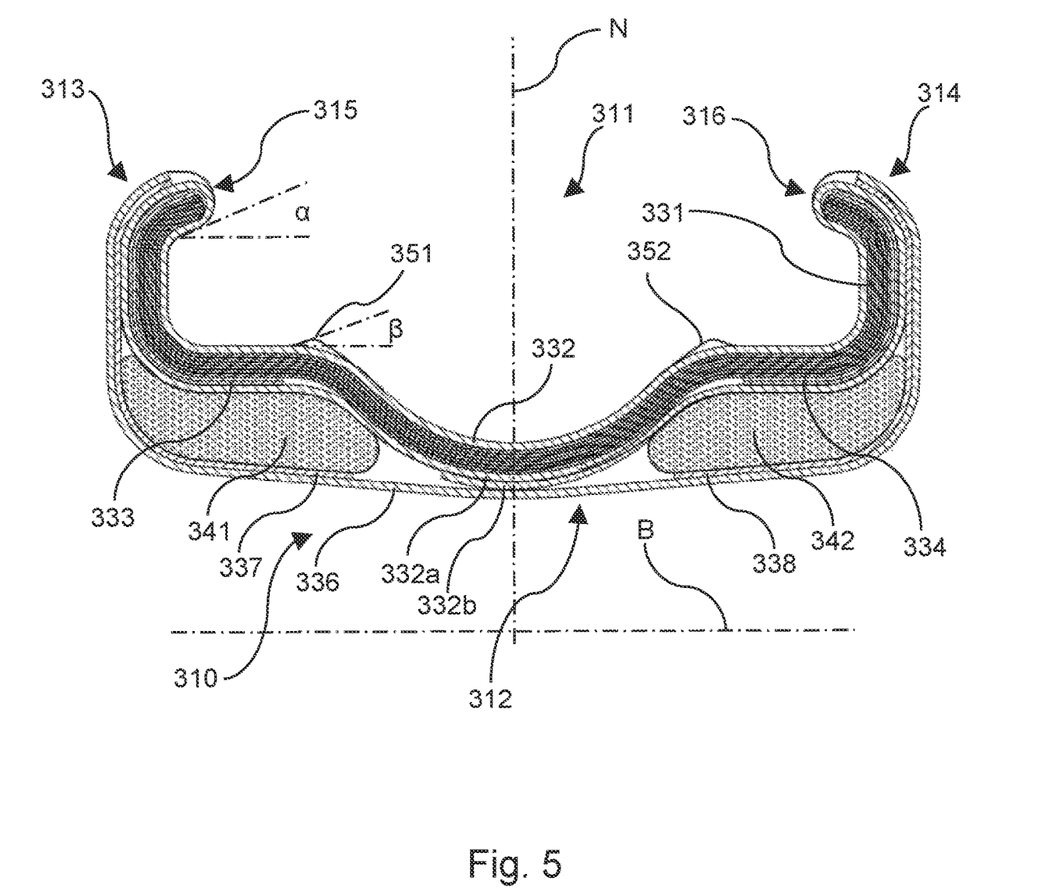
FIG. 5 is a schematic section view of a rim according to a second embodiment of the invention.

A different embodiment of the invention is represented in FIG. 5, which shows a rim 310 analogous to the rim 10, but with a simplified structure, with a single channel.

The rim 310 comprises a peripheral channel 311, with an upper bridge 312, extending between two opposite wings 313 and 314, adapted for holding a tyre; the wings 313 and 314 are provided with respective rounded ends 315 and 316, folded towards one another so as to form an acute angle α equal to about 20° with respect to a direction B parallel to the axis of the rim 310.

The peripheral channel 311 comprises an inner layered structure 331, extending through the entire upper bridge 312 from the wing 313 to the wing 314, and a wrapping layered structure 332. The wrapping layered structure 332 is wound around the inner layered structure 331 and closed on itself so as to completely surround the inner layered structure 331. The wrapping layered structure 332 comprises an initial flap 332a and a final flap 332b, overlapping over one another at the mid-plane N of the rim 310, in a radially inner position with respect to the upper bridge 312.

The peripheral channel also comprises two inner wing layered structures 333 and 334, arranged between the inner layered structure 331 and the wrapping layered structure 332 at each of the wings 313 and 314, and partially also of the upper bridge 312.

The rim 310 also comprises an outer layered structure 336, extending externally in the rim 310 from the wing 313, to the upper bridge 312, up to the wing 314. The outer layered structure 336 overlaps the wrapping layered structure 332 at the wings 313 and 314.

The rim 310 also comprises two outer wing layered structures 337 and 338, each of which is arranged between the outer layered structure 336 and the wrapping layered structure 332, at each of the wings 313 and 314.

The rim 10 also comprises two circumferential inserts 341 and 342, arranged in the two convergence areas between the upper bridge 312 and the wings 313 and 314. These circumferential inserts 341 and 342 (totally analogous to the circumferential inserts 41 and 42) are formed with directional structural fibres oriented in the circumferential direction of the rim 310, incorporated in polymeric material. The circumferential inserts 341 and 342 are inserted in the structure of the rim 310 between the wrapping layered structure 332 and the outer layered structure 336, below the outer wing layered structures 337 and 338.

The layered structures 331-338 are made in an analogous manner to the layered structures 31-38, each with one or more layers of structural fibres, preferably directional structural fibres.

The peripheral channel 311 comprises a pair of circumferential projections 351 and 352, totally analogous to the projections 51 and 52 of the rim 10. Each of them has a surface inclined by an acute angle β with respect to the direction B parallel to the rotation axis of the rim 310. With respect to the angle α of inclination of the ends 315 and 316 of the wings 313 and 314, the angle β is slightly less, by 0.5-4 degrees, preferably by about 2 degrees.

The rim 310 can be made with one of the methods known in the field, for example with a radial mold according to the teachings of EP 1231077B2. Preferably, the rim 310 is made in an analogous manner to the rim 10; in practice, the method is the same, except that of course all of the steps referring to the closed channel and to the lower bridge, which are not present here, are left out.

What is claimed is:

1. A bicycle rim, made with a plurality of layered structures of composite material, each formed by one or more layers of structural fibres incorporated in a polymeric material,
   wherein the rim comprises a radially outer peripheral channel comprising an upper bridge extending between two opposite wings for holding a tyre,
   wherein the peripheral channel comprises an inner layered structure, extending from one of the wings to the other, and a wrapping layered structure, wound to completely surround a surface of the inner layered structure and remain in contact with the inner layered structure with a wrapping layer initial flap and a wrapping layer final flap of the wrapping layered structure overlapping each other, the inner layered structure and the wrapping layered structure being included in said plurality of layered structures.

2. The bicycle rim according to claim 1, comprising a radially inner closed channel, integral with the peripheral channel in a radially inner position thereof,
   wherein the closed channel is defined by two opposite side walls joined together by the upper bridge and by a lower bridge in a radially inner position,
   wherein the closed channel comprises a closed channel layered structure, extending along the lower bridge, the side walls and at least part of the upper bridge, the closed channel layered structure being included in said plurality of layered structures.

3. The bicycle rim according to claim 2,
   wherein the closed channel layered structure ends at a closed channel initial flap and a closed channel final flap at the peripheral channel, wherein the closed channel initial flap and closed channel final flap of the closed channel layered structure are juxtaposed to the wrapping layered structure.

4. The bicycle rim according to claim 3,
   wherein the closed channel initial flap is spaced from the closed channel final flap, so as to leave the wrapping layered structure partially facing towards the inside of the closed channel.

5. The bicycle rim according to claim 3,
   wherein the closed channel initial flap overlaps the closed channel final flap, so that the inside of the closed channel is entirely surrounded by the closed channel layered structure.

6. The bicycle rim according to claim 1,
   wherein the peripheral channel comprises two inner wing layered structures, each overlapping the inner layered structure at each of the wings and enclosed together with the inner layered structure by the wrapping layered structure, the inner wing layered structures being included in said plurality of layered structures.

7. The bicycle rim according to claim 2, comprising
   an outer layered structure, extending externally from one of the wings, to one of the side walls, to the lower bridge, to the other of the side walls, to the other of the wings, wherein the outer layered structure overlaps the closed channel layered structure at the closed channel and over the wrapping layered structure at the wings, the outer layered structure being included in said plurality of layered structures.

8. The bicycle rim according to claim 7, comprising
   two outer wing layered structures, each arranged between the wrapping layered structure at each of the wings and the outer layered structure, and arranged between the closed channel layered structure at the closed channel and the outer layered structure, the outer wing layered structures being included in said plurality of layered structures.

9. The bicycle rim according to claim 7, comprising
   a lower bridge layered structure, at the lower bridge, the lower bridge layered structure being included in said plurality of layered structures.

10. The bicycle rim according to claim 9,
    wherein the lower bridge layered structure is arranged between the outer layered structure and the closed channel layered structure, or overlaps the closed channel layered structure on the opposite side with respect to the outer layered structure.

11. The bicycle rim according to claim 1,
    wherein the wings have respective ends folded towards one another according to a predetermined acute angle $\alpha$ with respect to the axial direction of the rim, and the peripheral channel comprises a pair of circumferential projections with a surface inclined by an acute angle $\beta$ with respect to the axial direction of the rim, wherein $\alpha > \beta$.

12. The bicycle rim according to claim 11, wherein the difference $\alpha - \beta$ is comprised between 0.5 and 4 degrees.

13. The bicycle rim according to claim 12, wherein the difference $\alpha - \beta$ is equal to about 2 degrees.

14. A method for making a bicycle rim of composite material based on structural fibres incorporated in a polymeric material, the rim comprising a radially outer peripheral channel comprising an upper bridge extending between two opposite wings for holding a tyre, comprising the following steps:
    a) providing: a radial mold shaped according to a profile of the bicycle rim; at least one pression element; and at least one mold insert for the formation in the mold of end areas adapted for the formation of the wings;
    b) laying a wrapping layered structure of uncured composite material comprising structural fibres incorporated in a polymeric material on a work plane;
    c) laying an inner layered structure of uncured composite material comprising structural fibres incorporated in a polymeric material on the wrapping layered structure, the inner layered structure having a length equal to that of the wrapping layered structure and width less than half the width of the wrapping layered structure;
    d) folding two opposite flaps of the wrapping layered structure in the width direction on the inner layered structure, overlapping them over one another;
    e) arranging the pression element and the wrapping layered structure in the mold, with the inner layered structure included and folded in a C shape, adjacent to the pression element;
    f) positioning the at least one mold insert in the mold, so that the wrapping layered structure with the inner layered structure enclosed reaches the end areas of the mold;
    g) closing the mold and applying a pressure on the wrapping layered structures and inner layered structures with the pression element, so as to make the polymeric material flow and move the structural fibres in the direction of the end areas of the mold, until the entire space between the mold and the at least one mold insert is occupied;
    h) subjecting the mold to a pressure and temperature profile such as to cause the setting of the polymeric material;
    i) opening the mold;
    j) removing the at least one mold insert;
    k) removing the molded bicycle rim.

15. The method according to claim 14, further comprising the steps of:
    a1) providing two circumferential inserts, wherein each insert is formed from directional structural fibres incorporated in a polymeric material, with the directional structural fibres oriented in the circumferential direction;
    f1) positioning the circumferential inserts in the mold, at a convergence area of the upper bridge with one of the wings, between the wrapping layered structure with the inner layered structure enclosed and the pression element.

16. The method according to claim 14, further comprising the step of:

d1) providing a closed channel layered structure wound on the pression element.

* * * * *